United States Patent [19]

Moon

[11] Patent Number: 5,519,307
[45] Date of Patent: May 21, 1996

[54] DC/DC CONVERTER FOR OUTPUTTING MULTIPLE SIGNALS

[75] Inventor: Seung H. Moon, Seoul, Rep. of Korea

[73] Assignee: Samsung Electronics Co., Ltd., Suwon, Rep. of Korea

[21] Appl. No.: 367,475

[22] Filed: Jan. 5, 1995

[30] Foreign Application Priority Data

Jan. 5, 1994 [KR] Rep. of Korea ............... 94-110

[51] Int. Cl.$^6$ ............... G05F 1/10; G05F 1/40
[52] U.S. Cl. ............... 323/222; 323/285
[58] Field of Search ............... 323/222, 223, 323/225, 242, 282, 284–287; 363/16, 19, 21, 59

[56] References Cited

U.S. PATENT DOCUMENTS

| | | | |
|---|---|---|---|
| 4,311,954 | 1/1982 | Capel | 323/222 |
| 4,536,700 | 8/1985 | Bello et al. | 323/285 |
| 4,542,330 | 9/1985 | Terbrack | 323/222 |
| 4,987,361 | 1/1991 | Ohms | 323/222 |
| 5,341,085 | 8/1994 | Ettes | 323/222 |
| 5,349,284 | 9/1994 | Whittle | 323/207 |

*Primary Examiner*—Matthew V. Nguyen

[57] ABSTRACT

A DC/DC converter for supplying a plurality of direct-current output voltages using a single pulse-width-modulator. A voltage regulator in the DC/DC converter comprises first and second switch elements, a pulse width modulator for generating a switching signal to control the switching of the first switch element, an inductor the generation and the collapse of the magnetic field thereof being controlled by selective conduction of the first switch element, and a capacitor charged with current supplied in response to the collapse of the magnetic field of the inductor as conducted thereto by selective conduction of the second switch element. The level of output voltage from the voltage regulator means is sensed to generate a control voltage, applied through output feedback circuitry for cutting off the generation and the collapse of the magnetic field of said inductor responsive to the control signal indicating that the level of the output voltage exceeds a prescribed value, thus to regulate the amount of charge supplied to the capacitor in response to the switching signal generated by the pulse width modulator. The output feedback circuitry includes first and second transistors that are connected by Darlington method with a base electrode of the first transistor having an emitter electrode of the second transistor connected thereto, with a base electrode of the second transistor connected to receive the control voltage, with an emitter electrode of the first transistor connected to receive the switching signal generated by the pulse width modulator, and with an interconnection of the collector electrodes of the first and second transistors connected to the first switch element for controlling the selective conduction thereof.

29 Claims, 2 Drawing Sheets

DC/DC CONVERTER FOR OUTPUTTING MULTIPLE SIGNALS

FIELD OF THE INVENTION

The present invention relates to a DC/DC converter for outputting multiple signals. More particularly, it relates to a DC/DC converter that may provide more than two kinds of output voltages by means of a pulse width modulating integrated circuit by detecting a level of output voltage to feedback, control and adjust the level of output voltage.

DESCRIPTION OF THE PRIOR ART

A power supply is generally characterized as being either a linear power supply using a transformer having a predetermined turns ratio or a switching mode power supply having a switching method using a power transistor, in accordance with the operating principle.

Although the switching mode power supply has a complicated circuit mechanism compared to the linear power supply, it is widely used as a power system of various small-sized electronic apparatus since the switching mode power supply has advantages of small size, light weight and high power density and so forth. That is because a pulse width modulating integrated circuit generating a switching waveform has been improved.

Recently, as the demand for portable electronic apparatus has been increased, a DC/DC converter using a switching mode power supply that can make many kinds of voltages of 1 such as a single power voltage 5V or 3.3V, is required, FIG. 1 is a detailed circuit diagram showing a conventional DC/DC converter. The following description is about the conventional DC/DC converter shown in FIG 1.

A power signal VCC applied to emitter of transistor Q1 is switched in accordance with a switching signal of pulse width modulating integrated circuit VPWM applied to base of transistor Q1, and the switched signal is input to base of transistor Q2 to control turn-on and turn-off operation of transistor Q2.

When transistor Q2 is turned on, a circuit in which the power signal VCC is applied to transistor Q2 through inductor L is formed. At that time, a magnetic field is built up surrounding the winding of an inductor L in accordance with the power signal VCC. While the magnetic field surrounding the winding of the inductor n is being built up, the charged voltage of capacitor C is discharged.

When transistor Q2 is turned off, a circuit in which the power signal VCC is applied to capacitor C through inductor L and diode D is formed. At that time, diode D is turned on by instantaneous high voltage induced to inductor L and condenser C is charged with the charged current to inductor L.

On the other hand, a level of output voltage of the capacitor C is determined by turn-off time of transistor Q2 which is determined by turn-on time of the switching signal of pulse width modulating integrated circuit PWM.

Accordingly, the output voltage of the conventional DC/DC converter is changed according to duty ratio of the switching signal of pulse width modulating integrated circuit.

Generally, the pulse width modulating integrated circuit can make one or two types of switching signal and direct current output voltage that may be generated from one pulse width modulating integrated circuit has two types at most.

However, when a power supply of portable electronic apparatus is required providing three or more types of direct current, two or more pulse width modulating integrated circuits are needed, which increases the bulk of power supply of portable electronic apparatus and manufacturing cost.

Modification of the output voltage from a switching mode power supply has been done in the prior art by selectively clamping the switching voltage supplied to the base of transistor Q1 to modify the on/off ratio of the emitter-to-base voltage. This changes the current-mode drive of the switching transistor in the switching mode power supply to voltage-mode drive that depletes charge on the base-emitter junction during turn off. This depletion of charge can slow the turn-off and subsequent turning on of transistor Q1. Slowed turn-off and turn-on tends to cause over-dissipation and possible burn-out unless the transistor Q1 is provided with substantial heat sinking. Modification of the output voltage from a switching mode power supply can be done in accordance with the invention by an alternative method that does not change the current-mode drive of the switching transistor in the switching mode power supply to voltage-mode drive. A controlled conductance element is included in the base connection of the transistor Q1 to permit only selective flow of base current thereinto responsive to the switching signal, so the on/off ratio of the transistor Q1 can be shortened, as compared to the on/off ratio of the transistor Q1 when the switching signal is supplied to its base without the interdiction of the controlled conductance element.

SUMMARY OF THE INVENTION

Any voltage within a range of values can be generated from a primary DC supply in response to a switching signal of given on/off ratio in a DC/DC converter embodying the invention. The converter comprises a switching voltage regulator portion; an output voltage sensing portion for detecting a level of output voltage of the switching voltage regulator portion, to supply a control voltage for adjusting that level; and an output feedback portion for carrying out the adjustment of that level. The switching voltage regulator portion has first and second switch elements, has a pulse width modulator for generating a switching signal to control the switching of the first switch element, has an inductor the generation and the collapse of the magnetic field surrounding a winding thereof being controlled by selective conduction of the first switch element, and has a capacitor charged with current supplied in response to the collapse of the magnetic field of the inductor as conducted thereto by selective conduction of the second switch element. The first switch element is a bipolar transistor and the second switch element is a rectifier diode. The output voltage sensing portion is generally a potential divider for supplying a control voltage that is a fraction of the DC/DC converter, and is most simply realized by serial connection of resistances to form a resistive potential divider. The output feedback portion of the converter, used for cutting off the generation and the collapse of the magnetic field of said inductor responsive to the control signal from the output voltage sensing portion indicating that the level of the output voltage exceeds a prescribed value, thus to regulate the amount of charge supplied to the capacitor in response to the switching signal generated by said pulse width modulator, comprises a controlled conductance element in the base connection of the bipolar transistor used as the first switch element in the switching voltage regulator portion of the converter.

DETAILED DESCRIPTION OF THE PREFERRED EMBODIMENTS

Figure 1:
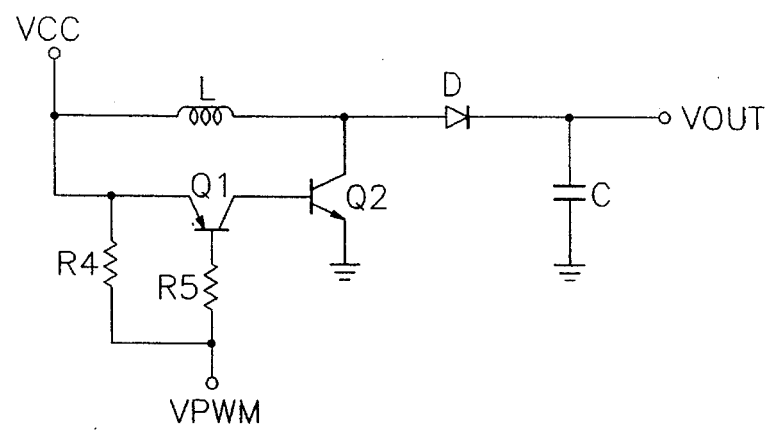
FIG. 1 is a detailed circuit diagram showing a conventional DC/DC converter.
Figure 2:
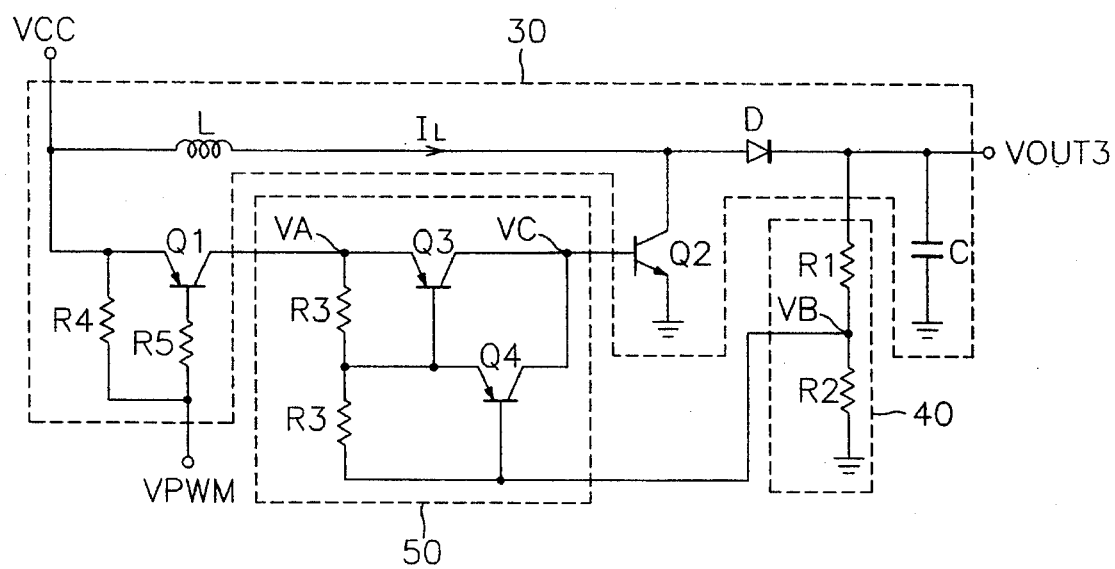
FIG. 2 is a detailed circuit diagram of a DC/DC converter for outputting multiple signals in accordance with a preferred embodiment of the present invention.

FIG. 2 is a detailed circuit diagram of a DC/DC converter that is a preferred embodiment of the present invention.

In the inventive DC/DC converter as shown in FIG. 2, a power signal VCC is applied to inductor L connected with diode D and capacitor C in series; a switching signal VPWM of pulse width modulation integrated circuit passed through resistance R5 is applied to base of transistor Q1; resistance R4 is connected to base-emitter of transistor Q1; and the power signal VCC is applied to emitter of transistor Q1.

Further, two transistors Q3 and Q4 that are in Darlington connection are connected to collector of transistor Q1; two resistances R3s having the same resistance value are respectively connected to emitter-base of transistors Q3 and Q4 that are connected by Darlington method; common collector of transistors Q3 and Q4 that are connected by Darlington method is connected to base of transistor Q2 of which collector is connected to node between inductor L and diode D; and node between two resistances R1 and R2 connected with capacitor C in parallel is connected with base of transistor Q4.

FIGS. 3A to 3E are wave forms of each portion of the DC/DC converter in accordance with the preferred embodiment of the prevent invention.

The following description is about the operation of the FIG. 2 DC/DC converter.

Figure 3A:
FIGS. 3A to 3E are waveforms of each portion of FIG. 2.

The power signal VCC is applied to emitter of inductor L and transistor Q1, and the switching signal of pulse width modulation integrated circuit VPWM as FIG. 3A is applied to emitter of transistor Q1 through resistance R5. The above power signal VCC is a system power of direct current applied from a battery of portable electronic apparatus.

Figure 3B:
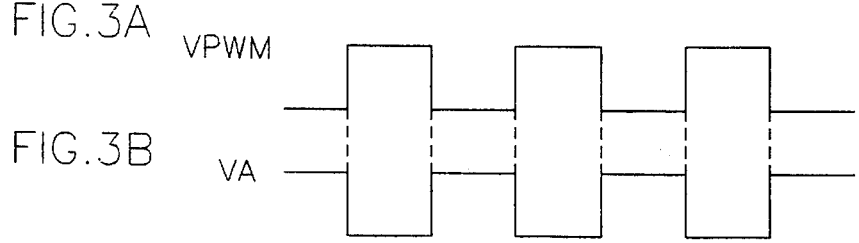

Switching signal VPWM is reversed into a level of the power signal VCC by the above transistor Q1. The switching signal VA reversed by the above transistor Q1 is as shown in FIG. 3B, and its size decreases as much as the size of voltage drop between a level of the power signal VCC and emitter-collector of transistor Q1.

Two resistances R1 and R2 connected with capacitor C of an output terminal are to detect the size of an output voltage VOUT3, and voltage component VB may be expressed as the equation:

$$VB = VOUT3 \times (1 + R1/R2)$$

Accordingly, voltage component VB is changed in proportion to the output voltage VOUT3 of capacitor C.

Two transistors Q3 and Q4 is turned on if voltage component VB-VA is greater than $2V_{BE}$, and two transistors Q3 and Q4 is turned off if VB-VA is smaller than $2V_{BE}$. The above $V_{BE}$ is voltage value of threshold of each transistor Q3 and Q4.

Accordingly, the on/off operation of transistor Q2 is controlled by reversed switching signal VA if VB-VA is greater than $2V_{BE}$ and two transistors Q3 and Q4 that are connected by Darlington method are turned on. The power signal VCC is applied to inductor L if the above transistor Q2 is turned on by reversed switching signal in FIG. 3B, and diode D is turned on by inductor L instantaneously having high voltage and capacitor C is charged by current flowing through inductor L, from the power signal VCC as the magnetic field surrounding its winding collapses.

Figure 3C:
Figure 3D:
Figure 3E:
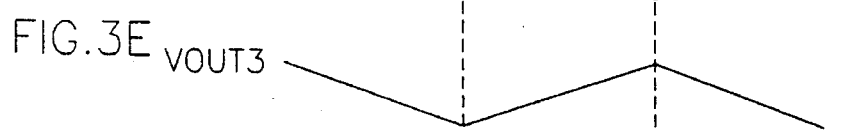

FIG. 3C shows an on/off signal VC applied to base of transistor Q2, and FIG. 3D shows a current $I_L$ flowing through inductor L, and FIG. 3E shows an output voltage VOUT3 of capacitor C.

The reversed switching signal. VA is applied to the base of transistor Q2 if VB-VA is greater than $2V_{BE}$ and the two transistors Q3 and Q4 are turned on.

If VB-VA is smaller than $2V_{BE}$ and the two transistors Q3 and Q4 are turned off, the above transistor Q2 is turned off, the power signal VCC is applied to capacitor C through inductor L and diode D, and the above capacitor C is charged by the power signal VCC. Accordingly, the operation for charging as much as the amount of voltage of the power signal only occurs if two transistors Q3 and Q4 are turned off.

The rated output voltage of the above capacitor C is the output voltage VOUT3 of capacitor C in case that two transistors Q3 and Q4 that ate connected by Darlington method, and the above output voltage VOUT3 of capacitor C may be expressed as the equation:

$$VOUT3 = (VA + 2V_{BE}) \times (1 + R1/R2)$$

Accordingly, it is possible to control at will the output voltage VOUT3 of capacitor C by controlling a resistance value ratio of two resistances R1 and R2 to detect the output voltage rOUT3 of capacitor C.

Figure 4:
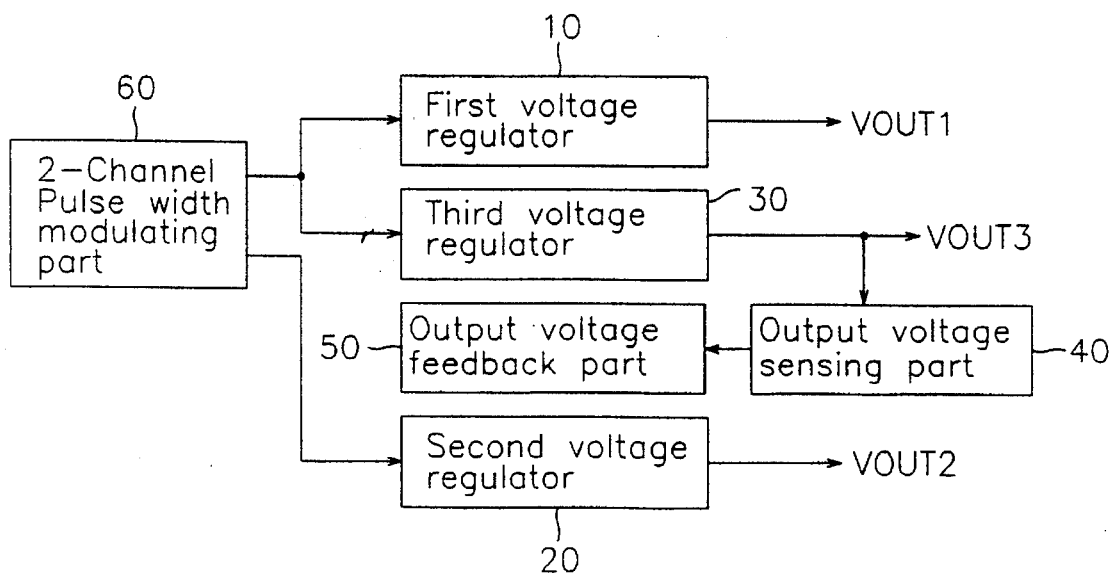
FIG. 4 is a block diagram of a power supply having a DC/DC converter for outputting multiple signals in accordance with a preferred embodiment of the present invention.

FIG. 4 is a block diagram showing a power supply including the DC/DC converter for outputting multiple signals in accordance with the preferred embodiment of the present invention.

In FIG. 4, first and second regulators 10 and 20 to which an output signal of 2-channel pulse width modulating part 60 is applied are relating to the conventional art, a third regulator 30, output voltage feedback part 50, and output voltage sensing part 40 are the DC/DC converter for outputting multiple signals in accordance with the preferred embodiment of the present invention.

Two kinds of output voltages VOUT1 and VOUT2 are generated by the above first and second regulators 10 and 20, and another level of output voltage VOUT3 is generated by the inventive DC/DC converter of the preferred embodiment of the present invention. Additionally, it is possible to connect two DC/DC converters or more of the preferred embodiment of the present invention in parallel to the above output terminal of 2-channel pulse width modulating part to obtain more various output voltages.

Accordingly, the present invention provides the DC/DC converter for outputting multiple signals of which the level of the output voltage may be voluntarily controlled, thereby obtaining various levels of output voltage using a single pulse width modulating circuit.

Although only a preferred embodiment and select modifications of the invention have been disclosed and described, it is apparent that other embodiments and modifications of the invention are possible within the scope of the appended claims.

What is claimed is:

1. A DC/DC converter comprising:

a pulse width modulator for generating a respective switching signal at each output terminal thereof;

voltage regulating means having a first switch element controlled by the switching signal from said pulse width modulator, having an inductor the generation and the collapse of the magnetic field thereof being controlled by selective conduction of said first switch element, having a capacitor, and having a selectively conductive second switch element for conducting the current flowing from said inductor in response to the collapse of the magnetic field thereof to charge said capacitor to generate the output voltage of said voltage regulating means thereacross;

output voltage sensing means for detecting a level of the output voltage of said voltage regulating means, to supply a control voltage for adjusting said level and output feedback means for reducing the generation and the collapse of the magnetic field of said inductor responsive to the control signal from the output voltage sensing means indicating that the level of the output voltage exceeds a prescribed value, thus, to regulate the amount of charge supplied to said capacitor in response to the switching signal generated by said pulse width modulator, wherein said output voltage feedback means includes first and second transistors that are connected by Darlington method with a base electrode of said first transistor having an emitter electrode of the second transistor connected thereto, with a base electrode of said second transistor connected to receive the control voltage supplied from said output voltage sensing means, with an emitter electrode of said first transistor connected to receive the switching signal generated by said pulse width modulator, and with an interconnection of the collector electrodes of said first and second transistors connected to said first switch element for controlling the selective conduction thereof.

2. The DC/DC converter according to claim 1, wherein said output voltage sensing means includes first and second resistances connected in series with each other across said capacitor for detecting at their interconnection with each other a voltage component applied to the base of said second transistor as said control voltage to control an on/off operation of the output voltage feedback means, and controls an output voltage across said capacitor.

3. The DC/DC converter according to claim 1 in combination with at least one further DC/DC converter of similar type, each of said DC converters converting from the same direct current input voltage, sharing the same pulse width modulator, having the first switch elements in their respective voltage regulating means controlled by the same switching signal from said pulse width modulator, and differing in their output voltage sensing means to provide different independently-regulated direct-current output voltages across their respective capacitors.

4. The DC/DC converter according to claim 1; wherein said DC/DC converter has input, output and common terminals; wherein said inductor has a winding with a first end connected to said input terminal and with a second end; wherein said capacitor has first and second plates respectively connected to said output terminal and to said common terminal; wherein said first switch element is a third transistor having a base electrode connected to the interconnection of the collector electrodes of said first and second transistors, having an emitter electrode connected to said common terminal, and having a collector electrode connected to the second end of said winding; and wherein said second switch element is a rectifier diode having first and second electrodes connected to the second end of said winding and to said output terminal.

5. A direct-current to direct-current converter comprising:

an input terminal and a common terminal, for receiving an input potential of a prescribed polarity therebetween;

an output terminal;

a display, for receiving a pulse signal;

a capacitor connected between said common terminal and said output terminal for supplying an output potential of said prescribed polarity thereacross;

an inductor with a winding having a first end connected to said input terminal and having a second end;

a first transistor of a first conductivity type, having a respective first electrode connected to said common terminal, having a respective second electrode connected to the second end of said winding, and having a respective third electrode, said first transistor being operable as a first switching element for selectively connecting the second end of said winding to said common terminal at first times in response to control current flow through its said third electrode;

a second switching element for selectively connecting the second end of said winding to said output terminal at second times other than said first times;

a second transistor of a second conductivity type complementary to said first conductivity type, having a respective first electrode connected to said input terminal, having a respective second electrode, having a respective third electrode connected to said display, and providing a selectively conductive path between its said first and second electrodes in response to pulse signal received at its third electrode; and a controlled conductance element between the second electrode of said second transistor and the third electrode of said first transistor, the conductance of said controlled conductance element being controlled by a control potential derived from said output potential.

6. A direct-current to direct-current converter as set forth in claim 5, wherein said second switching element is a rectifier diode.

7. A direct-current to direct-current converter as set forth in claim 5, wherein said controlled conductance element includes:

a third transistor of said second conductivity type, having a respective first electrode to which the second electrode of said second transistor connects, having a respective second electrode connected to the third electrode of said first transistor, having a respective third electrode to which said control potential derived from said output potential is applied, and providing a selectively conductive path between its said first and second electrodes in response to said control potential.

8. A direct-current to direct-current converter as set forth in claim 7, wherein said controlled conductance element further includes:

a first resistor having respective first and second ends connected to the first and third electrodes, respectively, of said third transistor; and a second resistor having respective first and second ends, its said first end connected to the third electrode of said third transistor, and its said second end connected to receive said control potential.

9. A direct-current to direct-current converter as set forth in claim 8, wherein said controlled conductance element further includes:

a further transistor of said second conductivity type, having a respective first electrode connected to the third electrode of said third transistor for applying said control potential derived from said output potential thereto, having a respective second electrode connected to the third electrode of said first transistor, having a respective third electrode for receiving said control potential derived from said output potential, and providing a selectively conductive path between its said first and second electrodes in response to said control potential.

10. A direct-current to direct-current converter as set forth in claim 9, wherein the third electrode of said further transistor connects to the second end of said second resistor.

11. A direct-current to direct-current converter as set forth in claim 10, wherein said first and second resistors have respective resistances that are similar in value.

12. A direct-current to direct-current converter as set forth in claim 5, wherein said controlled conductance element includes:

a further transistor of said second conductivity type, having a respective first electrode, having a respective second electrode connected to the third electrode of said first transistor, having a respective third electrode to which said control potential derived from said output potential is applied, and providing a selectively conductive path between its said first and second electrodes in response to said control potential; and a first resistor having a respective first end to which the second electrode of said second transistor connects and having a respective second end connected to the first electrode of said further transistor.

13. A direct-current to direct-current converter as set forth in claim 12, wherein said controlled conductance element further includes:

a second resistor having respective first and second ends connected to the first and third electrodes, respectively, of said further transistor.

14. A direct-current to direct-current converter as set forth in claim 5 further comprising:

a potential divider dividing the output potential at said output terminal as referenced to the potential at said common terminal for supplying a divided output potential applied to said controlled conductance element as its said control potential.

15. A direct-current to direct-current converter as set forth in claim 10, wherein said potential divider is formed from serially connected resistors.

16. A direct-current to direct-current converter as set forth in claim 14, wherein said second switching element is a rectifier diode.

17. A direct-current to direct-current converter as set forth in claim 14, wherein said controlled conductance element includes:

a third transistor of said second conductivity type, having a respective first electrode to which the second electrode of said second transistor connects, having a respective second electrode connected to the third electrode of said first transistor, having a respective third electrode to which said divided output potential is applied, and providing a selectively conductive path between its said first and second electrodes in response to said control potential.

18. A direct-current to direct-current converter as set forth in claim 17, wherein said controlled conductance element further includes:

a first resistor having respective first and second ends connected to the first and third electrodes, respectively, of said third transistor; and a second resistor having respective first and second ends, its said first end connected to the third electrode of said third transistor, and its said second end connected to receive said control potential.

19. A direct-current to direct-current converter as set forth in claim 18, wherein said controlled conductance element further includes:

a further transistor of said second conductivity type, having a respective first electrode connected to the third electrode of said third transistor for applying said divided output potential thereto, having a respective second electrode connected to the third electrode of said first transistor, having a respective third electrode for receiving said divided output potential, and providing a selectively conductive path between its said first and second electrodes in response to said control potential.

20. A direct-current to direct-current converter as set forth in claim 19, wherein the third electrode of said further transistor connects to the second end of said second resistor.

21. A direct-current to direct-current converter as set forth in claim 20, wherein said first and second resistors have respective resistances that are similar in value.

22. A direct-current to direct-current converter as set forth in claim 14, wherein said controlled conductance element includes:

a further transistor of said second conductivity type, having a respective first electrode, having a respective second electrode connected to the third electrode of said first transistor, having a respective third electrode to which said divided output potential is applied, and providing a selectively conductive path between its said first and second electrodes in response to said control potential; and a first resistor having a respective first end to which the second electrode of said second transistor connects and having a respective second end connected to the first electrode of said further transistor.

23. A direct-current to direct-current converter as set forth in claim 22, wherein said controlled conductance element further includes:

a second resistor having respective first and second ends connected to the first and third electrodes, respectively, of said further transistor.

24. A direct-current to direct-current converter comprising:

an input terminal and a common terminal, for receiving an input potential of a prescribed polarity therebetween;

an output terminal;

a pulse-input terminal, for receiving a pulse signal;

a capacitor connected between said common terminal and said output terminal for supplying an output potential of said prescribed polarity thereacross;

an inductor with a winding having a first end connected to said input terminal and having a second end;

a first transistor of a first conductivity type, having a respective first electrode connected to said common terminal, having a respective second electrode connected to the second end of said winding, and having a respective third electrode, said first transistor being operable as a first switching element for selectively connecting the second end of said winding to said common terminal at first times in response to control current flow through its said third electrode;

a second switching element for selectively connecting the second end of said winding to said output terminal at second times other than said first times; and second and third transistors of a second conductivity type complementary to said first conductivity type, each of said second and third transistors providing a respective selectively conductive path between respective first and second electrodes thereof in response to a respective potential received at a respective third electrode thereof; the first and second electrodes of said second and third transistors connected so their respective selectively conductive paths are serially arranged between said input terminal and the third electrode of said first transistor, the third electrode of said second transistor connected to said pulse-input terminal, and the third electrode of said third transistor having a control potential derived from said output potential applied thereto.

25. A direct-current to direct-current converter as set forth in claim 24, further comprising:

a first resistor having respective first and second ends connected to the first and third electrodes, respectively, of said third transistor; and a second resistor having respective first and second ends, its said first end connected to the third electrode of said third transistor, and its said second end connected to receive said control potential.

26. A direct-current to direct-current converter as set forth in claim 25, further comprising:

a further transistor of said second conductivity type, having a respective first electrode connected to the third electrode of said third transistor for applying said control potential derived from said output potential thereto, having a respective second electrode connected to the third electrode of said first transistor, having a respective third electrode for receiving said control potential derived from said output potential, and providing a selectively conductive path between its said first and second electrodes in response to said control potential.

27. A direct-current to direct-current converter as set forth in claim 26 further comprising:

a potential divider dividing the output potential at said output terminal as referenced to the potential at said common terminal for supplying said control potential.

28. A direct-current to direct-current converter as set forth in claim 27 wherein said potential divider comprises:

third and fourth resistors having respective first ends connected to said output terminal and to said common terminal respectively and having respective second ends with an interconnection therebetween from which said control potential is supplied.

29. A direct-current to direct-current converter as set forth in claim 27, wherein said second switching element is a rectifier diode.

* * * * *